US011650977B2

(12) United States Patent
Aleksandrovich et al.

(10) Patent No.: US 11,650,977 B2
(45) Date of Patent: May 16, 2023

(54) ANNOTATING DATASETS WITHOUT REDUNDANT COPYING

(71) Applicant: YAHOO ASSETS LLC, Dulles, VA (US)

(72) Inventors: George Aleksandrovich, Hoffman Estates, IL (US); Allie K. Watfa, Urbana, IL (US); Robin Sahner, Urbana, IL (US); Mike Pippin, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 427 days.

(21) Appl. No.: 16/727,096

(22) Filed: Dec. 26, 2019

(65) Prior Publication Data

US 2021/0200747 A1 Jul. 1, 2021

(51) Int. Cl.
*G06F 16/23* (2019.01)
*G06F 7/08* (2006.01)

(52) U.S. Cl.
CPC ............ *G06F 16/2379* (2019.01); *G06F 7/08* (2013.01)

(58) Field of Classification Search
CPC ............. G06F 16/2282; G06F 16/2379; G06F 16/254; G06F 7/08
See application file for complete search history.

(56) References Cited

U.S. PATENT DOCUMENTS

| | | | |
|---|---|---|---|
| 2002/0184401 A1* | 12/2002 | Kadel, Jr. ................. | G06F 9/54 719/315 |
| 2016/0085834 A1* | 3/2016 | Gleeson .............. | G06F 16/2282 707/693 |
| 2016/0171092 A1* | 6/2016 | Mueller .................. | G06F 16/00 707/741 |
| 2017/0060829 A1* | 3/2017 | Bhatt ..................... | G06F 40/169 |
| 2017/0163418 A1* | 6/2017 | Lanc ......................... | H04L 9/14 |
| 2018/0196793 A1* | 7/2018 | Hsu ..................... | G06F 16/9566 |

* cited by examiner

*Primary Examiner* — Richard L Bowen
(74) *Attorney, Agent, or Firm* — James J. DeCarlo; Greenberg Traurig, LLP

(57) ABSTRACT

Disclosed embodiments are methods, apparatuses, and computer-readable media for annotating distributed data without redundant data copying. In one embodiment, a method is disclosed comprising reading a raw dataset, the raw dataset comprising a first set of columns and a first set of rows; generating an annotation dataset, the annotation dataset comprising a second set of columns and a second set of rows; assigning row identifiers to each row in the second set of rows, the row identifiers aligning the second set of rows with the first set of rows based on the underlying storage of the raw dataset and annotation dataset; and writing the annotation dataset to a distributed storage medium.

14 Claims, 11 Drawing Sheets

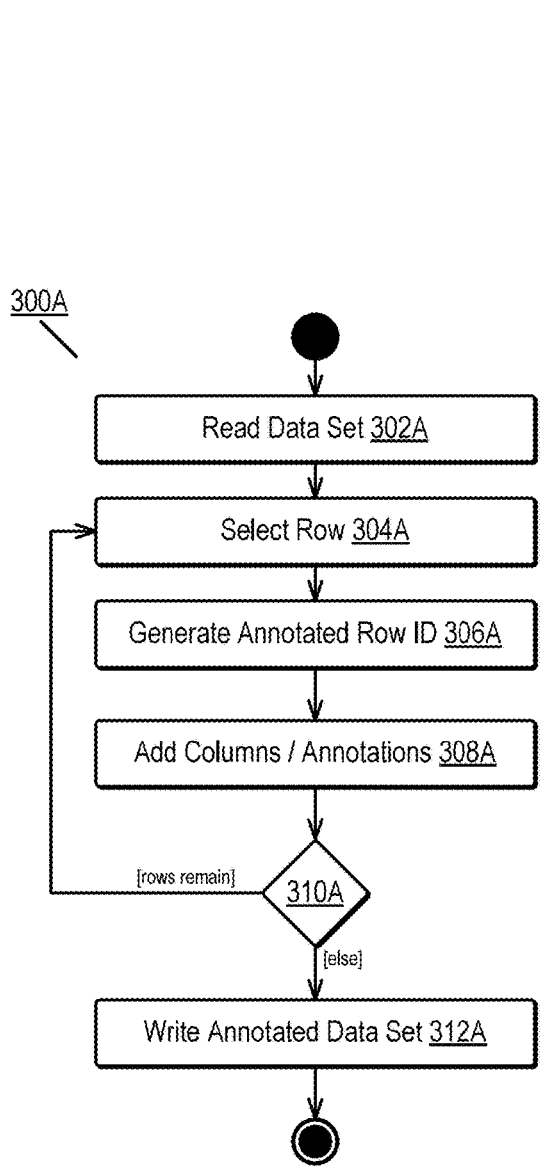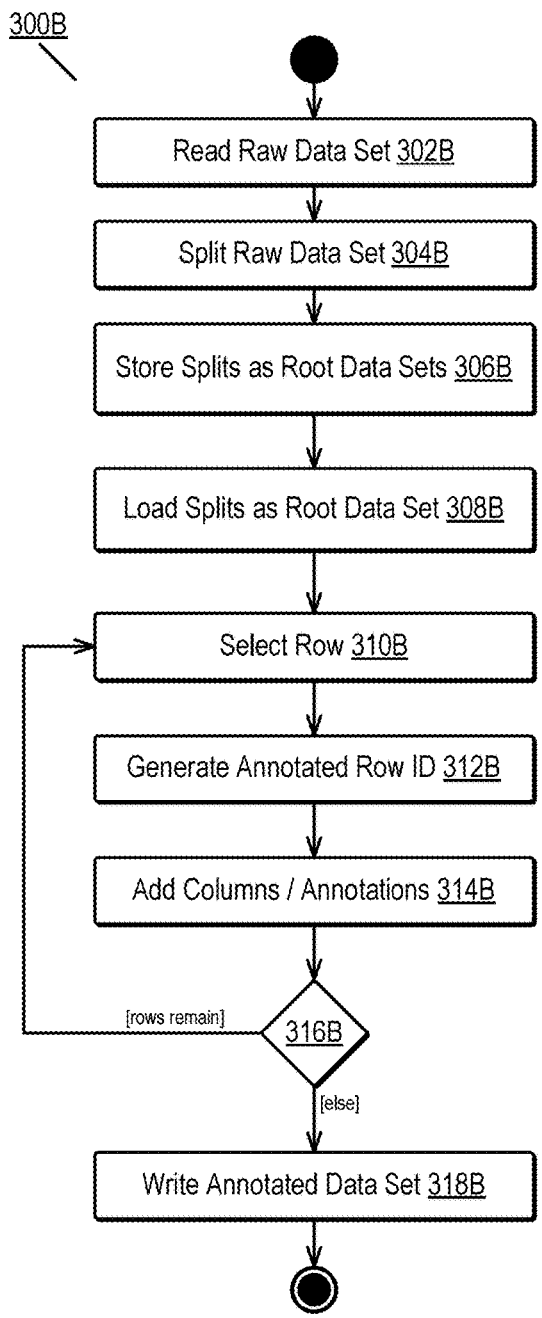
FIG. 3A
FIG. 3B

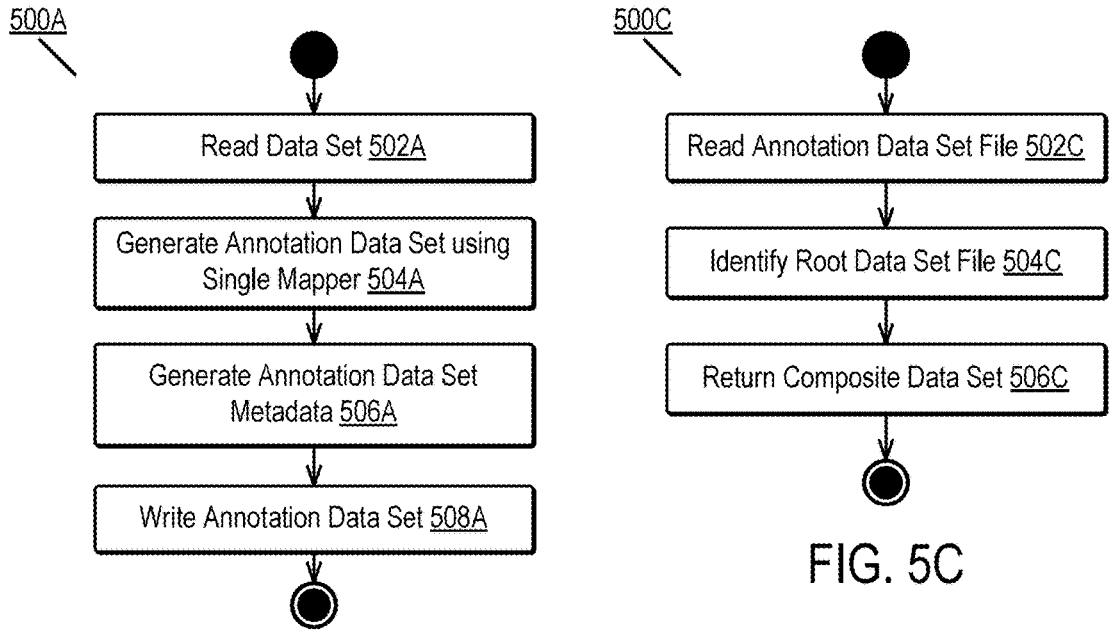
FIG. 5A
FIG. 5C
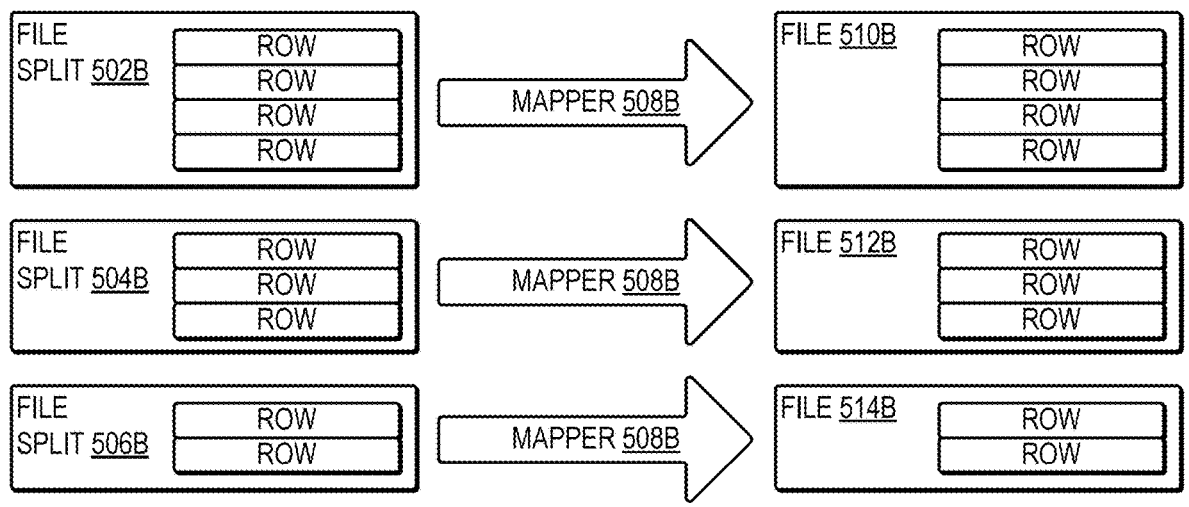
FIG. 5B

ANNOTATING DATASETS WITHOUT REDUNDANT COPYING

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments relate to distributed data processing and, in particular, to techniques for annotating datasets without the redundant copying of datasets.

In big data and distributed processing/computing systems such as Hadoop, it is common to amass large datasets based on, for example, high-velocity data such as clickstream data. For downstream processing of such data, it is frequently common to add additional data to the original datasets (referred to as annotating data). In current systems, adding annotations involves a duplication of the original data, forming a new dataset that includes the original data and the new annotation data. For example, annotating clickstream data comprises copying the entire clickstream dataset and adding one or more columns to the dataset and then populating these new columns with the annotation data. The result is that current systems are required to read and process entire datasets as well as duplicate the same data across additional files. Frequently, this copying is also performed multiple times as annotations can be added on already annotated data. Thus, if a previously annotated dataset is annotated again, the original data is copied twice, resulting in three copies of the same data.

As a result of this annotating, datasets can serially grow in size. Thus, the processing of annotating datasets increases (in both complexity and time requirements) as more data is annotated. As a result, many current systems periodically prune unnecessary columns during annotation, resulting in a sparser dataset that does not include the original data. While such an approach may reduce the processing time, it removes the context in which the original data was used to generate annotations and thus limits the use of the annotated data. Further, additional annotations cannot be made on the dataset if such annotations required the underlying original data.

Thus, there is a current need in the art to provide annotations of large datasets while simultaneously retaining the original raw data during the annotation.

BRIEF SUMMARY

The disclosed embodiments solve these and other technical problems by providing a storage layer for a distributed storage system that allows for the creation and processing of annotation data layers. In some embodiments, the disclosed embodiments are provided as a storage layer on Hadoop systems, although the disclosed embodiments are not limited to such a system. The various techniques described herein may be implemented as a hybrid file format implemented as a thin wrapper layer on a distributed file system.

In one embodiment, a method is disclosed comprising reading a raw dataset, the raw dataset comprising a first set of columns and a first set of rows; generating an annotation dataset, the annotation dataset comprising a second set of columns and a second set of rows; assigning row identifiers to each row in the second set of rows, the row identifiers aligning the second set of rows with the first set of rows based on the underlying storage of the raw dataset and annotation dataset; and writing the annotation dataset to a distributed storage medium.

In another embodiment, a non-transitory computer-readable storage medium for tangibly storing computer program instructions capable of being executed by a computer processor is disclosed, the computer program instructions defining the steps of: reading a raw dataset, the raw dataset comprising a first set of columns and a first set of rows; generating an annotation dataset, the annotation dataset comprising a second set of columns and a second set of rows; assigning row identifiers to each row in the second set of rows, the row identifiers aligning the second set of rows with the first set of rows based on the underlying storage of the raw dataset and annotation dataset; and writing the annotation dataset to a distributed storage medium.

In another embodiment, an apparatus is disclosed comprising: a processor; and a storage medium for tangibly storing thereon program logic for execution by the processor, the stored program logic causing the processor to perform the operations of: reading a raw dataset, the raw dataset comprising a first set of columns and a first set of rows; generating an annotation dataset, the annotation dataset comprising a second set of columns and a second set of rows; assigning row identifiers to each row in the second set of rows, the row identifiers aligning the second set of rows with the first set of rows based on the underlying storage of the raw dataset and annotation dataset; and writing the annotation dataset to a distributed storage medium.

BRIEF DESCRIPTION OF THE FIGURES

FIG. 3A is a flow diagram illustrating a method for writing an annotation dataset according to some embodiments of the disclosure.

FIG. 3B is a flow diagram illustrating a method for writing an annotation dataset according to some embodiments of the disclosure.

FIG. 5A is a flow diagram illustrating a method for writing an annotation dataset using file-based alignment according to some embodiments of the disclosure.

FIG. 5B is a diagram illustrating a mapping process performed in a distributed computing environment using a file-based alignment scheme according to some embodiments of the disclosure.

FIG. 5C is a flow diagram illustrating a method for reading an annotation dataset using file-based alignment according to some embodiments of the disclosure.

DETAILED DESCRIPTION

Figure 1:
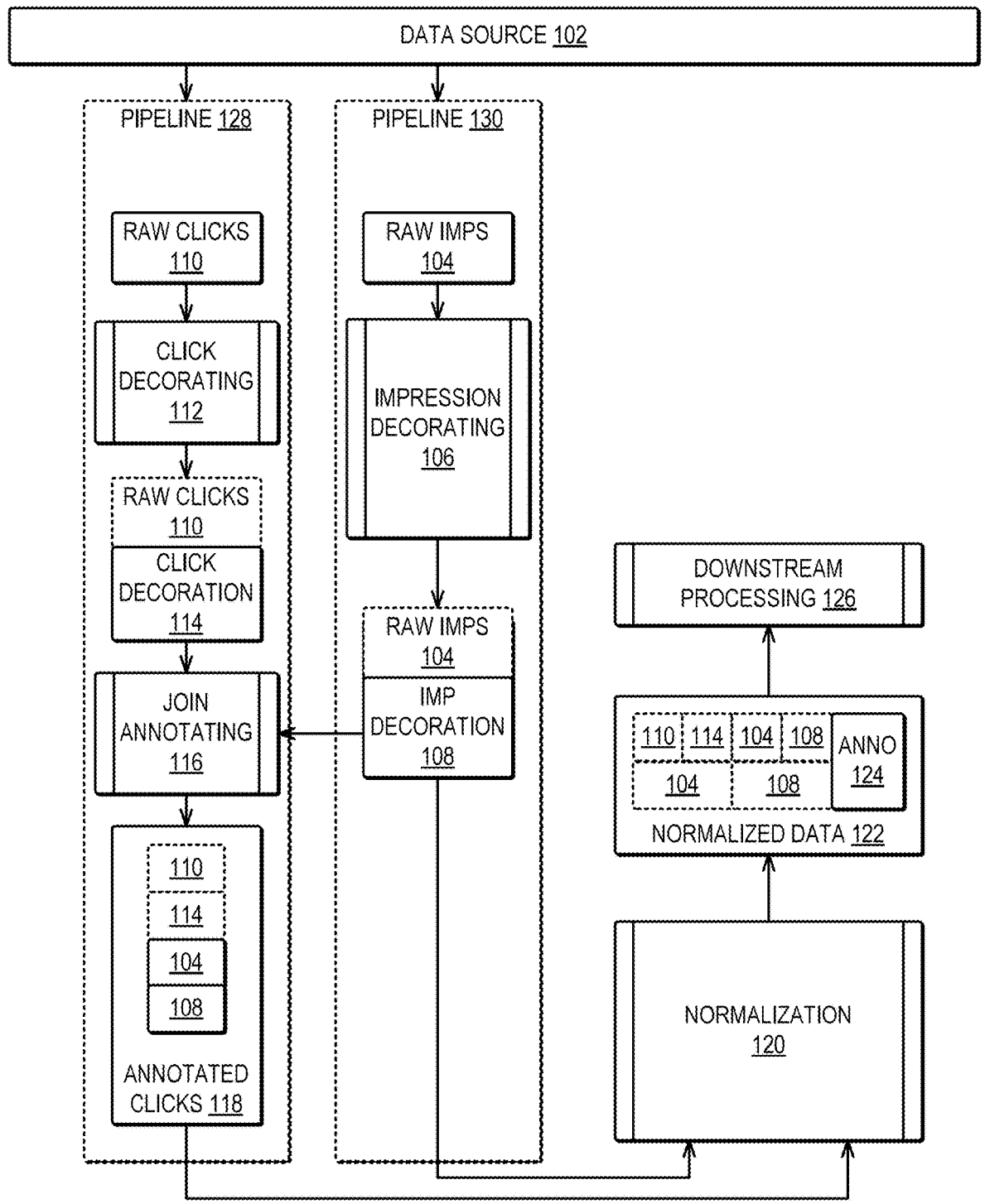
FIG. 1 is a system diagram illustrating a distributed processing system according to some embodiments of the disclosure.

FIG. 1 is a system diagram illustrating a distributed processing system according to some embodiments of the disclosure.

In the illustrated embodiment, a plurality of pipelines (128, 130) process data from a data source (102). In one embodiment, data source (102) can comprise a data lake or similar big data storage device. In the illustrated embodiment, the data source (102) can include a large volume of unstructured data. In some embodiments, the data source (102) can include structured data such as column-oriented data. In some embodiments, the data source (102) can comprise log file data storage or similar types of storage. In some embodiments, the data source (102) stores data in structured filetypes such as Orc, Avro, or Parquet filetypes.

In the illustrated embodiment, the pipelines (128, 130) comprise distributed processing pipelines. Each pipeline (128, 130) may comprise a plurality of distributed computing devices. In one embodiment, each pipeline (128, 130) can read data from the data source (102), process the data, and load the data into a structured data repository. In some embodiments, all of the above processing may be done in a distributed computing environment running on commodity hardware (e.g., a Hadoop cluster or similar cluster).

The illustrated pipelines (128, 130) further illustrate an annotation workflow. As used herein, annotation refers to the processing of stored data to add new data or supplement the data with existing data. Data to be annotated is referred to as raw data or a raw dataset. Additions to the raw data are referred to as annotated data. A combination of raw data and annotated data is referred to as composite data.

In pipeline (130) raw impression data (104) is received. The use of impression data is provided as an example and other data types may be used. The embodiments place no limit on the underlying type of data processed herein. The raw impression data (104) can refer to data regarding the display of content in webpages (e.g., the time viewed, the owner of the content, etc.). Raw impression data (104) is generally amassed via log files that log the selection and display of content. In the illustrated embodiment, the raw impression data (104) can comprise a plurality of database columns and rows. In some embodiments, this data can be stored in Orc, Parquet, or other column-oriented data formats.

The raw impression data (104) is processed during an impression decorating stage (106). In the illustrated embodiment, the impression decorating stage (106) can comprise a Pig or Hive script or other similar data processing script. Generally, the impression decorating stage (106) performs one or more operations on the raw impression data (104). For example, the impression decorating stage (106) can add additional columns to the raw impression data or can alias column names.

The output of the impression decorating stage (106) is an impression annotation dataset, also referred to as a decorated impression dataset (108). As illustrated, the impression decorating stage (106) does not copy the raw impression data (104) to a new location. Instead, the raw impression data (104) is locally processed. That is, the impression decorating stage (106) can comprise a distributed algorithm that is run on the same device that is storing the raw impression data (104). In contrast, however, the decorated impression data (108) is written to disk after being created. In the illustrated embodiment, the decorated impression dataset (108) comprises a set of columns capturing only the new data to decorate the raw impression data with. The decorated impressions (108) and raw impressions (104) are accessed by pipeline (128) to further annotate a clickstream, as described herein.

Similar to pipeline (130), pipeline (128) receives raw click data (110). In one embodiment, raw click data (110) can comprise data regarding user selection of digital content. For example, while raw impression data (104) can include rows for each time a piece of content is displayed on a web page, raw click data (110) can include rows for each time that content is selected by a user.

Similar to the impression decorating stage (106), the click decorating stage (112) adds one or more columns or fields to the raw data. As in stage (106), the click decorating stage (112) generates these additional columns for fields as a physically distinct file (114). Thus, the click decorating stage (112) does not modify or copy the raw click data (110) when generating the decorate click data (114).

In the illustrated embodiment, a join annotating stage (116) receives the raw click and impression data (110, 104) and the decorated clicks and impressions (114, 108). In some embodiments, the join annotating stage (116) copies the impression data (104, 108) to form the annotated clicks dataset (118). In one embodiment, the join annotating stage (116) filters the impression data (104, 108) to identify only that impression data relevant to the click data (110, 114) and uses the filtered data as an annotation set to generate the annotated clicks.

In the illustrated embodiment, a normalization stage (120) is configured to receive the combined impression composite dataset (104, 108) and the composite annotated clicks dataset (118). In one embodiment, the normalization stage (120) is configured to add a further annotation to the composite datasets. For example, the normalization stage may perform grouping or sorting of the data as well as synthesized columns based on aggregations of the underlying data. As a result, the normalization stage (20) generates a normalized annotation dataset (122). As illustrated, only the annotations (124) are written to disk during this stage, and the remaining data (104, 108, 110, 114) is not copied to a new location on disk.

Finally, the normalized annotation dataset (122) is provided to downstream processing applications for analysis, further processing, and storage, as required by such applications. As indicated in the figure via dotted lines, datasets in the pipelines are not copied during the annotation phases. The result is that the normalized data (122) can include the annotation results of the pipeline (128, 130) stages, the normalization annotations, and the raw underlying data without incurring the computationally expensive copying costs required by existing solutions. Specific methods for avoiding this unnecessary copying are described in more detail herein in the context of a distributed computing platform such as Hadoop.

Figure 2A:
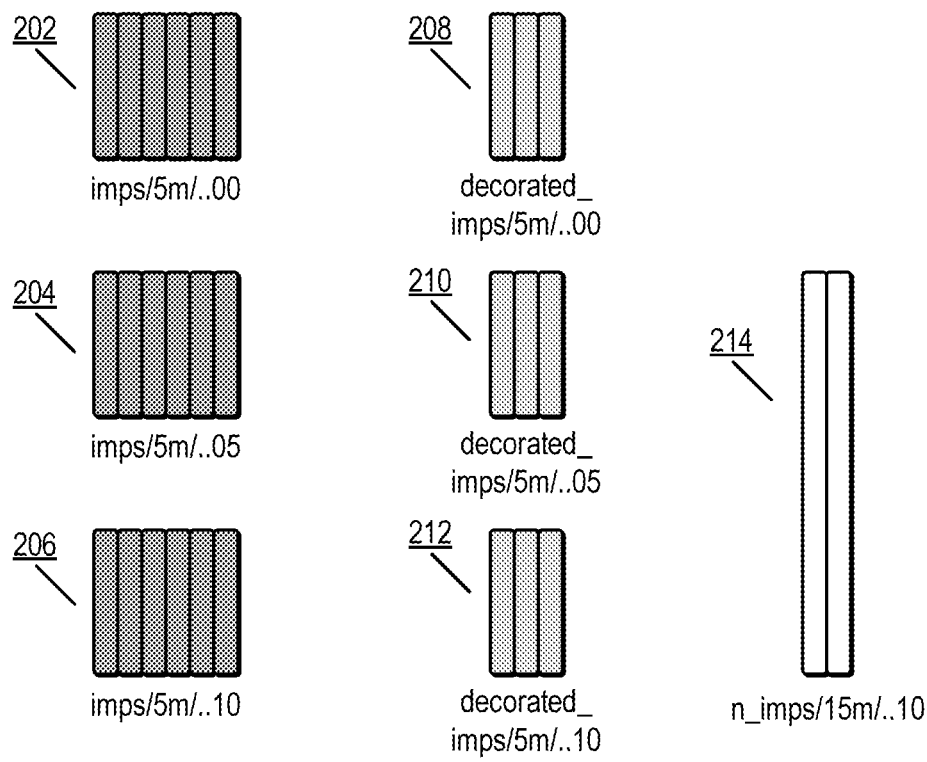
FIG. 2A illustrates the physical storage layout of a distributed processing system according to some embodiments of the disclosure.

FIG. 2A illustrates the physical storage layout of a distributed processing system according to some embodiments of the disclosure.

In the illustrated embodiment, a set of rows and columns representing raw data is stored at three locations (202, 204, 206). As one example, these locations (202, 204, 206) can comprise three physically distinct storage devices storing a portion of the entire dataset represented by the portions. In one embodiment, each location (202, 204, 206) comprises a file and each file can be stored on the same, or different, computing devices.

In addition to raw data (202, 204, 206), decoration data is stored in three locations (208, 210, 212). Similar to locations (202, 204, 206), the decoration data is stored in individual files stored on the same or different computing devices. Notably, the decoration data is stored in files separate from the raw data.

Finally, a second level of annotation data is stored at location (214). Again, this location comprises a separate file from the previous locations (202 through 212). Thus, each set of annotations is stored in physically separate files or other structures. Further, there is no limitation on the mapping of the number of files between raw data and annotations. As illustrated, raw data is stored in three files at three locations (202, 204, 206). Similarly, second level annotation data is also stored in three files at three locations (208, 210, 212). However, the final layer of annotation data is stored in a single file at one location (214). To facilitate this, each annotation structure includes a row identifier that will be described in more detail herein that enables the stitching together of raw data and annotations during processing.

Figure 2B:
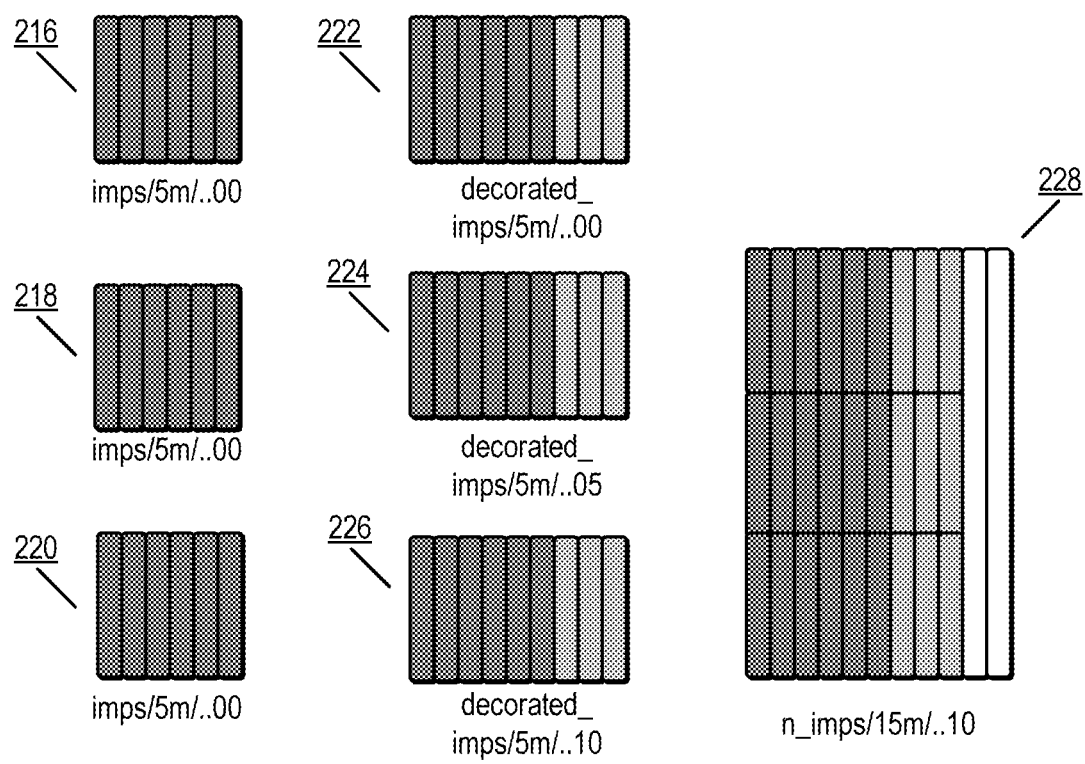
FIG. 2B illustrates the logical storage layout of a distributed processing system according to some embodiments of the disclosure.

FIG. 2B illustrates the logical storage layout of a distributed processing system according to some embodiments of the disclosure.

The illustrated storage layout comprises a logical view of the same data depicted physically in FIG. 2A. The illustrated view represents the view of data presented to downstream applications accessing the annotation datasets. In the illustrated embodiment, raw datasets are stored at first locations (216, 218, 220), first annotations are stored at second locations (222, 224, 226) and a third annotation is stored at a third location (228). When accessing the first annotations (222, 224, 226), a downstream processing algorithm accesses both the annotations (e.g., 208) and the raw data (e.g., 202) when accessing the second location (222). Further, when accessing the third location (228), the entire annotation dataset appears as a single logical dataset while comprising separate physical files.

FIG. 3A is a flow diagram illustrating a method for writing an annotation dataset according to some embodiments of the disclosure.

In step 302a, the method (300a) reads a dataset. In one embodiment, the method (300a) may be implemented as a Pig, Hive, or other Hadoop script. In step 302a, the method (300a) loads a file from a location in the distributed file system. In one embodiment, the file can comprise an Avro, Orc, Parquet, or other filetype stored by a distributed file system. In one embodiment, the file comprises a column-oriented data file. In other embodiments, row-oriented storage formats may be used, although column-oriented formats generally improve performance due to the column-related operations described herein. In some embodiments, the method (300a) may load a dataset created using a user-defined loading format. In this embodiment, the method (300a) loads the dataset using a user-defined function that can process the underlying data format (described herein).

In some embodiments, before step 302a, the method (300a) further includes converting a standard file input format to a root data file format. In these embodiments, the standard file input comprises a golden dataset. As used herein, a golden dataset comprises a set of original raw data stored in a standard format such as Avro, CSV, TSV, text, or another format. In some embodiments, this golden dataset may comprise read-only data recorded by the system (e.g., clickstream data, impression data, etc.). In this embodiment, the method (300a) may use a general-purpose file loader (e.g., Avro loader) to load the raw data. Next, the method (300a) may store the data to disk using a user-defined function that formats the data accordingly. In some embodiments, this formatting may include re-ordering the columns and adding a unique identifier to each row.

In step 304a, the method (300a) selects a row of data from the dataset retrieved in step 302a. In some embodiments, this selection may be performed manually. In other embodiments, the selection may be made as part of a Pig FOREACH command or similar construct. In this embodiment, the method (300a) loads the raw dataset as a relation and performs data transformations on each row of the relation using FOREACH.

In step 306a, the method (300a) generates an annotated row identifier (ID). In one embodiment, this row ID is generated using a pre-configured ID generation algorithm (as described in more detail herein) and is applied to each row of the dataset.

In step 308a, the method (300a) adds columns or annotations to the dataset. The format and number of columns or annotations are not limited herein and may comprise any data desired to be annotated on the dataset retrieved in step 302.

In step 310a, the method (300a) determines if all of the rows have been assigned a row ID and corresponding annotations. If not, the method (300a) re-executes steps 304a through 308a for each remaining row.

The foregoing steps 304a through 310a are further exemplified in lines 2-5 of the following pseudocode sample:

```
dataset = LOAD '$ROOT/raw_data' USING AnnotatedStorage( );
decorated_dataset = FOREACH dataset GENERATE
    annotated_row_id,
    UPPER(page_url) as upper_url:chararray,
    ((bid is null OR bid <0) ? null : LOG10(bid)) as
bid:double;
STORE decorated_dataset INTO '$ROOT/annotated' USING
AnnotationStorage( );
```

In the foregoing code sample, a dataset is loaded in line 1 (step 302a) and decorated in lines 2 through 5. As illustrated, the annotation dataset includes three additional columns. The first column (line 3) comprises the annotated row ID. The second column includes a column that includes an uppercased version of the "page_url" column of the original dataset. The third document comprises a nullable value representing a bid cost that filters null and negative bids from the original data. Sample results of this process are depicted in Table 1 below:

| Raw Dataset | | |
|---|---|---|
| page_url | ... | bid |
| abc | | −12 |
| def | | 10 |
| ghi | | 1 |
| jkl | | 100 |
| mno | | null |

| Annotation Dataset | | |
|---|---|---|
| annotated_row_id | page_url | bid |
| ROW_ID_1 | ABC | null |
| ROW_ID_2 | DEF | 1 |
| ROW_ID_3 | GHI | 0 |
| ROW_ID_4 | JKL | 2 |
| ROW_ID_5 | MNO | null |

Notably, other fields of Original Data are omitted, and the annotated_row_id field does not include various field parameters described herein.

In step 312*a*, the method (300*a*) writes the annotation dataset to disk. In the illustrated embodiment, the method (300*a*) writes the annotated dataset as a single file to disk. This file may be stored distinctly from the file or files representing the raw dataset.

In the illustrated embodiment, the above processing may be implemented using a map-reduce paradigm, which is described in more detail with respect to aligning rows of the annotation dataset with the original data. Specifically, in one embodiment, a map stage converts a set of rows of the original dataset to an annotated dataset file. An optional reduce stage may perform additional operations such as re-ordering etc. of the files. In the illustrated embodiment, the resulting annotation file is stored according to the underlying filesystem implementation (e.g., Orc, Avro, etc.). Thus, the annotation dataset may always be accessed via standard filesystem inspection tools.

FIG. 3B is a flow diagram illustrating a method for writing an annotation dataset according to some embodiments of the disclosure. The illustrated method (300*b*) ultimately writes an annotation dataset as described in FIG. 3A. However, the illustrated method (300*b*) illustrates operations on composite datasets.

In step 302*b*, the method (300*b*) reads a raw dataset. In one embodiment, this raw dataset comprises a standard-formatted data file such as an Avro file or a similar structure.

In step 304*b*, the method (300*b*) splits the raw dataset into one or more datasets. In one embodiment, in this step, the method (300*b*) pre-processes the raw data based on one or more conditions. In some embodiments, this step may be part of an overall data processing pipeline and may not be done exclusively for annotating data. For example, a data pipeline may be configured to split temporal data into buckets of a preconfigured length periodically.

In step 306*b*, the method (300*b*) stores the split raw data (referred to as "splits") as root datasets. In one embodiment, storing raw data as a root dataset comprises storing a partition of the original raw data in a separate data file.

An example implementation of steps 302*b* through 306*b* is provided in the following pseudocode:

```
1.   data = LOAD '$ROOT/raw' USING AvroLoader( )
2.   SPLIT data INTO
     data_a if (receive_time % 3 = 0),
     data_b if (receive_time % 3 = 1),
     data_c otherwise;
3.   STORE data_a INTO '$ROOT/data_1' USING
     CreationStorage( );
4.   STORE data_b INTO '$ROOT/data_2' USING
     CreationStorage( );
5.   STORE data_c INTO '$ROOT/data_3' USING
     CreationStorage( );
```

As indicated above, raw data is loaded using a standard file system loader (line 1). The data is then split into three datasets (lines 3-5) based on a column value (receive_time), ignoring checking for null values for the sake of brevity. Finally, the three relations are stored using a user-defined annotation creation function. In one embodiment, this creation function creates the data files and also adds an annotation row ID for the rows of the new split. Additionally, the creation function manages the metadata for each data file, as described in more detail herein.

As a result, after step 306*b*, the method (300*b*) stores multiple segments of an original data file. In some embodiments, the foregoing steps (302*b*, 304*b*, 306*b*) are optional and may be performed offline.

In step 308*b*, the method (300*b*) loads the splits as a root dataset. In one embodiment, the method (300*b*) globs the split filenames when loading the data and combines the returned data into a single dataset.

After globbing the root dataset, the method (300*b*) selects a row (310*b*), generates an annotated row identifier (312*b*), adds any columns or annotations (314*b*), re-executes steps 310*b* through 314*b* for all rows and upon processing all rows writes the annotation dataset to disk (318*b*). These steps (310*b*, 312*b*, 314*b*, 316*b*, 318*b*) are performed identically to that described in steps 304*a*, 306*a*, 308*a*, 310*a*, and 312*a* of FIG. 3A and the disclosure of those steps is incorporated in its entirety herein.

Generally, the method (300*a*, 300*b*) can be applied to the same data. The resulting annotation datasets produced by each would be equivalent. However, the resulting annotation dataset provided in method (300*b*) would result in a re-ordering of rows do the split operation performed in step 304*b*. Additionally, since the methods (300*a*, 300*b*) generate new annotation dataset files, the methods (300*a*, 300*b*) can be executed in parallel with other annotation processes. Thus, if X represents an original dataset, the composite datasets XY and XZ (adding annotation sets Y and Z) can be created in parallel.

Figure 4A:
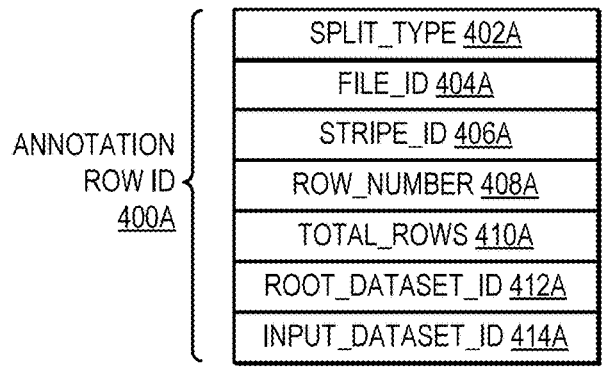
FIG. 4A is a diagram of an annotated row identifier according to some embodiments of the disclosure.

FIG. 4A is a diagram of an annotated row identifier according to some embodiments of the disclosure. Further, details of annotated row identifiers are described more fully in co-pending U.S. application Ser. No. 16/727,060.

In the embodiments, an annotated row identifier (ID) (also referred to as simply the "row ID") is added to each row of an annotation dataset. The row ID identifies the source of any row of data across multiple input paths. The row ID enables unordered records to be partitioned and ordered and allows a writer to ensure that all records are routed into the correct output. The row ID is unique, orderable, partitionable, serializable, and, in most embodiments, small.

In the illustrated embodiment, the row ID format (400*a*) includes a split type field (402*a*). This field (402*a*) identifies how input data used to create a record was split. In one embodiment, the split field identifies whether an input data source was split based on file boundaries or based on stripe boundaries. The format (400*a*) also includes a file identifier (404*a*) and stripe identifier (406*a*) that identifies a file location and stripe location (if necessary), respectively. The format (400*a*) includes a row number field (408*a*) that identifies the relative location of the record for a file or stripe identified in fields (404*a*, 406*a*). The format (400*a*) includes a total row count field (410*a*) indicates how many rows are in a given file or stripe. Finally, the format (400*a*) includes a root dataset identifier field (412*a*) and an input dataset identifier field (414*a*). The root dataset identifier field (412*a*) comprises the primary dataset used for the annotation. The input dataset identifier field (414*a*) comprises the immediately preceding dataset used to generate the annotation. In some scenarios, the fields (412*a*, 414*a*) may comprise the same value.

Figure 4B:
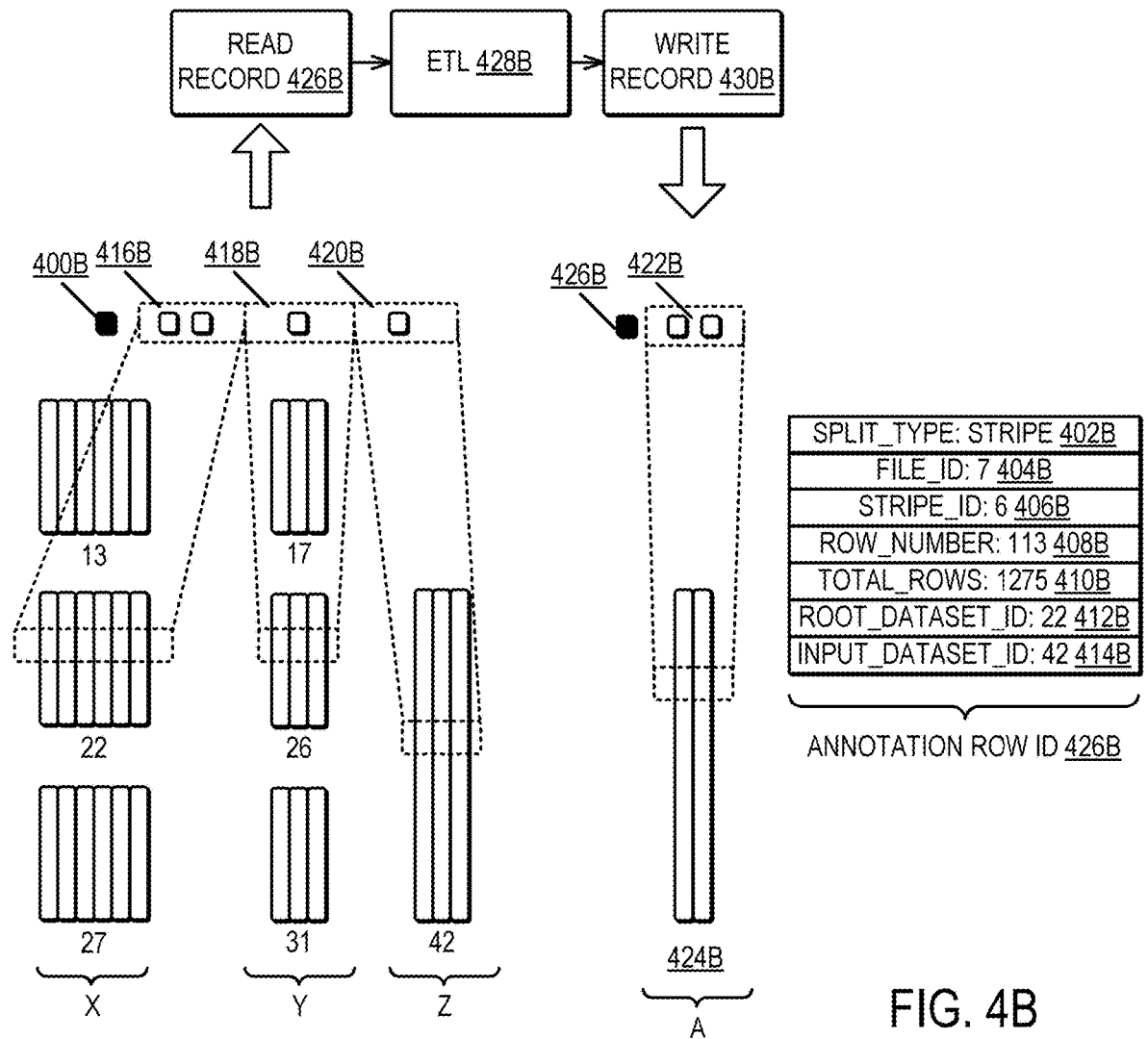
FIG. 4B is a diagram illustrating a process of writing an annotation row identifier according to some embodiments of the disclosure.

FIG. 4B is a diagram illustrating a process of writing an annotation row identifier according to some embodiments of the disclosure.

In the diagram illustrated, a process is attempting to create a new annotation A on top of three existing datasets (X, Y, Z). The process of writing data (422*b*) to annotation A is performed using a record reader (426*b*), an ETL (extract, transform, load) operation (428*b*) such as a Pig script, and a record writer (430*b*).

In the illustrated embodiment, the record reader (426*b*) accesses the dataset comprising XYZ. The dataset XYZ comprises a composite dataset comprising root dataset X and annotation datasets Y and Z. Each row of the composite dataset includes a row ID (400*b*). In the illustrated embodiment, the row ID (400*b*) may be associated with a row stored in dataset 42 (i.e., dataset Z). The returned row additionally includes fields (416*b*) from dataset X, fields (418*b*) from dataset Y, and fields (420*b*) from dataset Z. As described above, the ETL (428*b*) processing stage can access these fields and transform or augment the data to create new columns and thus new field values (422*b*) to store in the annotation set A (424*b*).

Before writing the record (430*b*), the ETL (428*b*) stage can generate a new row ID (426*b*). This new row ID (426*b*) is depicted in expanded form as including the previously described fields (402*b*-414*b*). In the illustrated embodiment, the new row ID (426*b*) can be built based on the row ID (400*b*) associated with the composite dataset XYZ. For example, the root dataset identifier will be the same. In the illustrated embodiment, the split type is set to stripe (402*b*) which is provided for example purposes only and a file type split may also be used in some embodiments. Since the split type is "stripe," the ETL (428*b*) sets the file ID to 7 (404*b*). In this embodiment, specific files are not illustrated in the diagram but it can be presumed that dataset 22 is located in file 7 (other datasets may be stored in other files). The stripe identifier (406*b*) is set to six, indicating the stripe that the row in dataset 22 is located in. The row number (408*b*) and total rows (410*b*) are set to 113 and 1275 respectively, and the root dataset identifier is set to dataset 22 in dataset X. Notably, the foregoing fields may be extracted from the root ID (400*b*). However, the row ID (426*b*) changes the input dataset ID to point to dataset 42 in dataset Z, which represents the dataset used to generate the record. The input dataset identifier enables the intermediate datasets (Y, Z) to be identified iteratively without storing each identifier in the row ID, allowing for arbitrary length widths of annotated datasets.

After generating the row ID, the record writer (430*b*) persists the row (and annotation dataset 424*b*) to disk as described previously. The use of row IDs allows for alignment of datasets when generating datasets located in different files and processed by different map-reduce tasks. FIGS. 5A-5C and 6A-6C illustrate two techniques for aligning annotation datasets based on splitting a root dataset.

FIG. 5A is a flow diagram illustrating a method for writing an annotation dataset using file-based alignment according to some embodiments of the disclosure. FIG. 5B is a diagram illustrating a mapping process performed in a distributed computing environment using a file-based alignment scheme according to some embodiments of the disclosure.

In step 502*a*, the method (500*a*) reads a dataset. In one embodiment, the dataset comprises a root dataset, although composite datasets may also be read. In step 502*a*, multiple physical files may be read when reading a dataset. As illustrated in FIG. 5B, a dataset is split based on file boundaries into three files (502*b*, 504*b*, 506*b*), each file containing a set of rows. In one embodiment, the method (500*a*) forces the distributed file system to split data based on file boundaries.

In step 504*a*, the method (500*a*) generates an annotation dataset using a single mapper. As known in the art, mapper tasks are distributed to data nodes of a Hadoop system. In step 504*a*, the method (500*a*) causes the system to distribute the map task (508*b*) to each data node containing the files (502*b*, 504*b*, 504*c*). The map task (508*b*) is configured to operate on a single file. As described previously, the map task (508*b*) annotates the rows of a given file (502*b*, 504*b*, 506*b*) and generates annotation row identifiers for the resulting annotation dataset. In the illustrated embodiment, the writing is mapper only: no reduce phase is required to generate the output files (510*b*, 512*b*, 514*b*). In some embodiments, a reducer phase can be implemented if needed by the underlying ETL instructions. If a reducer phase (not illustrated) is included, a separate final partition reducer stage is needed, which is discussed in the descriptions of FIGS. 7A and 7B.

In step 506*a*, the method (500*a*) generates annotation dataset metadata. In one embodiment, this may be performed by a reducer task. In one embodiment, the metadata describes the annotation dataset. The metadata may include structural metadata, split coordination metadata, and a schema. In some embodiments, the metadata for a given annotation set is stored in a file separate from the underlying data.

In general, the output annotation dataset is composed of horizontal and vertical unions of raw datasets. In some embodiments, each annotation dataset is assigned a unique identifier (e.g., a 64-bit identifier). Structural metadata provides the ID of the annotation dataset that the metadata describes as well as the ID's of the datasets from which the annotation dataset is constructed and how those sets are combined with one another. The split coordination metadata describes how the annotation data file is split. In the illustrated embodiment, the split coordination metadata includes a fixed-length array that enumerates all splits in the dataset. In the illustrated embodiment, elements of the array include a relative path name followed by a start and length that covers the entire file. In one embodiment, the schema metadata may comprise a list of columns added via the annotation dataset.

Further detail on metadata files for annotation datasets is provided in co-pending U.S. patent application Ser. No. 16/727,142.

In step 508a, the method (500a) writes the annotation dataset to disk. As illustrated, the output of the map task (508b) comprises files (510b, 512b, 514b), including rows representing the annotation data. Thus, as a final stage, the mappers (508b) write the annotation datasets to the files identified in the metadata file. Alternatively, if reducer stages are implemented, the reducer may write the files.

FIG. 5C is a flow diagram illustrating a method for reading an annotation dataset using file-based alignment according to some embodiments of the disclosure.

In step 502c, the method (500c) reads an annotation dataset file. In one embodiment, the method (500c) may begin by receiving a request to read an entire annotation dataset. In this scenario, the metadata file generated in step 506a is accessed, and the file paths are identified. Then, the method (500c) is executed for each file path. In one embodiment, the method (500c) forces a map task (not illustrated) to be executed on an entire file identified in step 502c.

In step 504c, the method (500c) identifies the root dataset file associated with a given annotation dataset file. In some embodiments, the method (500c) also identifies any intermediate dataset files using the metadata. Thus, in step 504c, the method (500c) identifies a set of files, one per data dataset.

In step 506c, the method (500c) returns a composite dataset. In the illustrated embodiment, the composite dataset comprises rows including columns from each of the root and (optionally) intermediate datasets. In operation, map tasks are assigned to process each split (including all files associated with a split). The map tasks access the data files and stitch together the rows based on the row identifiers aligning the data. The map tasks then return the composite dataset to a set of reducers which concatenates the output to a complete composite dataset.

Figure 6A:
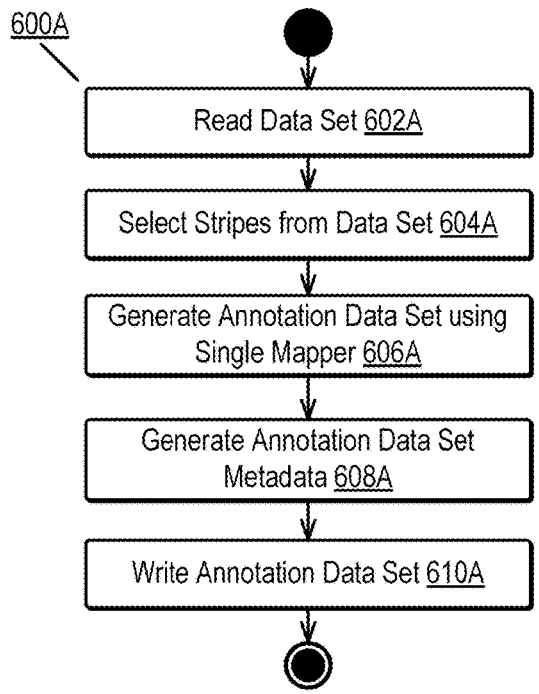
FIG. 6A is a flow diagram illustrating a method for writing an annotation dataset using stripe-based alignment according to some embodiments of the disclosure.

FIG. 6A is a flow diagram illustrating a method for writing an annotation dataset using stripe-based alignment according to some embodiments of the disclosure. FIG. 6B is a diagram illustrating a mapping process performed in a distributed computing environment using a stripe-based alignment scheme according to some embodiments of the disclosure.

In step 602a, the method (600a) reads a dataset. In one embodiment, the dataset comprises a root dataset, although composite datasets may also be read. In step 602a, multiple physical files may be read when reading a dataset. As illustrated in FIG. 6B, a dataset is split based on stripe boundaries into six splits (602b, 604b, 606b, 608b, 610b, 612b), each split containing a set of rows. Although described using stripes, RowGroups or other similar constructs may be used. As illustrated, a given file may span splits (e.g., 602b, 604b).

In step 604a, the method (600a) selects a set of stripes from a given dataset. In some embodiments, the method (600a) may select a preconfigured number of stripes based on system requirements (e.g., a preferred stripe length for output data). As illustrated in FIG. 6B, the resulting stripes may span multiple files. Thus, a stripe-based alignment mechanism enables a reduced number of data files for an annotation dataset since decisions are premised on stripes rather than files.

In step 606a, the method (600a) generates an annotation dataset using a single mapper. As known in the art, mapper tasks are distributed to data nodes of a Hadoop system. In step 606a, the method (600a) causes the system to distribute the map task (614b) to each data node containing the stripes (602b, 604b, 606b, 608b, 610b, 612b). The map task (614b) is configured to operate on a set of stripes in one or more splits. As described previously, the map task (614b) annotates the rows of a given split (602b, 604b, 606b, 608b, 610b, 612b) as well as generates annotation row identifiers for the resulting annotation dataset. In the illustrated embodiment, the writing is mapper only, but reducer phases may be added as described previously in connection with FIG. 5B.

In step 608a, the method (600a) generates annotation dataset metadata. In one embodiment, this may be performed by a reducer task. In one embodiment, the metadata describes the annotation dataset. The metadata may include structural metadata, split coordination metadata, and a schema as described in the description of FIG. 5A. In contrast to the metadata generated in FIG. 5A, the split coordination metadata would include more entries containing file paths but would include smaller lengths and non-zero starting locations indicating stripe boundaries.

In step 610a, the method (600a) writes the annotation dataset to disk. As illustrated, the output of the map task (614b) comprises files (616b, 618b) including rows representing the annotation data. Thus, as a final stage, the mappers (614b) write the annotation datasets to the files identified in the metadata file. Alternatively, if reducer stages are implemented, the reducer may write the files.

Figure 6C:
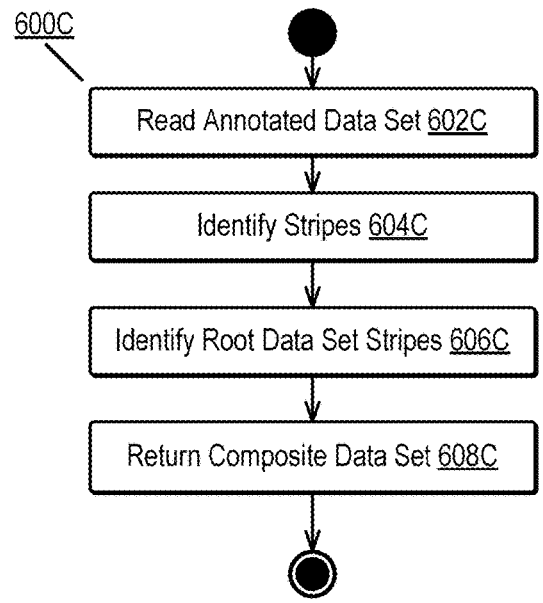
FIG. 6C is a flow diagram illustrating a method for reading an annotation dataset using stripe-based alignment according to some embodiments of the disclosure.
Figure 6B:
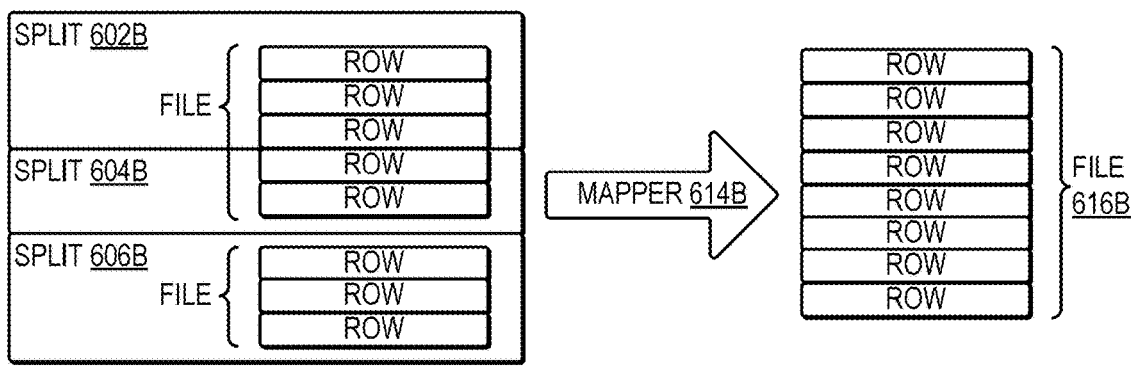
FIG. 6B is a diagram illustrating a mapping process performed in a distributed computing environment using a stripe-based alignment scheme according to some embodiments of the disclosure.
Figure 6B:
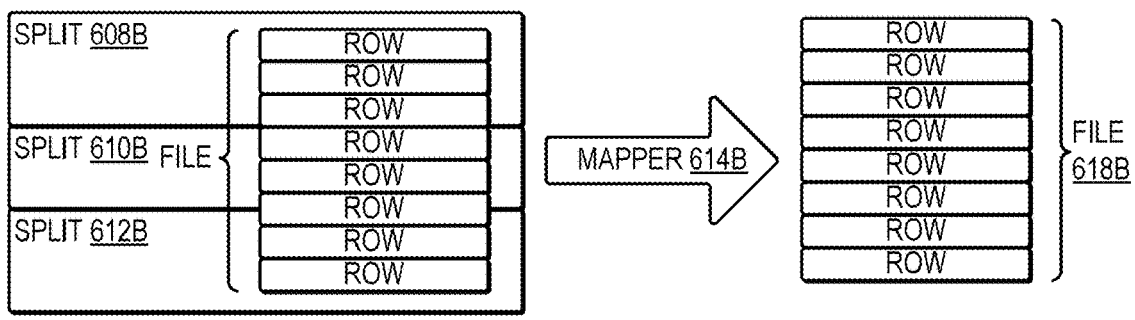

FIG. 6C is a flow diagram illustrating a method for reading an annotation dataset using stripe-based alignment according to some embodiments of the disclosure.

In step 602c, the method (600c) reads an annotation dataset. In one embodiment, the method (600c) may begin by receiving a request to read an entire annotation dataset.

In step 604c, the method (600c) identifies the stripes associated with the annotation dataset. As described above, the method (600c) may access the metadata file to identify the file paths, starting locations, and length to identify the stripes forming the annotation dataset.

In step 606c, the method (600c) identifies the root dataset stripes associated with a given annotation dataset stripe. In some embodiments, the method (600c) also identifies any intermediate dataset stripes using the metadata. Thus, in step 606c, the method (600c) identifies a set of stripes, one per data dataset, and processes these using a single map task.

In step 608c, the method (600c) returns a composite dataset. In the illustrated embodiment, the composite dataset comprises rows including columns from each of the root and (optionally) intermediate datasets. In operation, map tasks are assigned to process each split (including all stripes associated with a split). The map tasks access the stripes and stitch together the rows based on the row identifiers aligning the data. The map tasks then return the composite dataset to a set of reducers which concatenates the output to a complete composite dataset.

The operations described in FIGS. 5A, 5B, 5C, 6A, 6B, and 6C are described in more detail in the U.S. patent application Ser. No. 16/727,219.

Figure 7A:
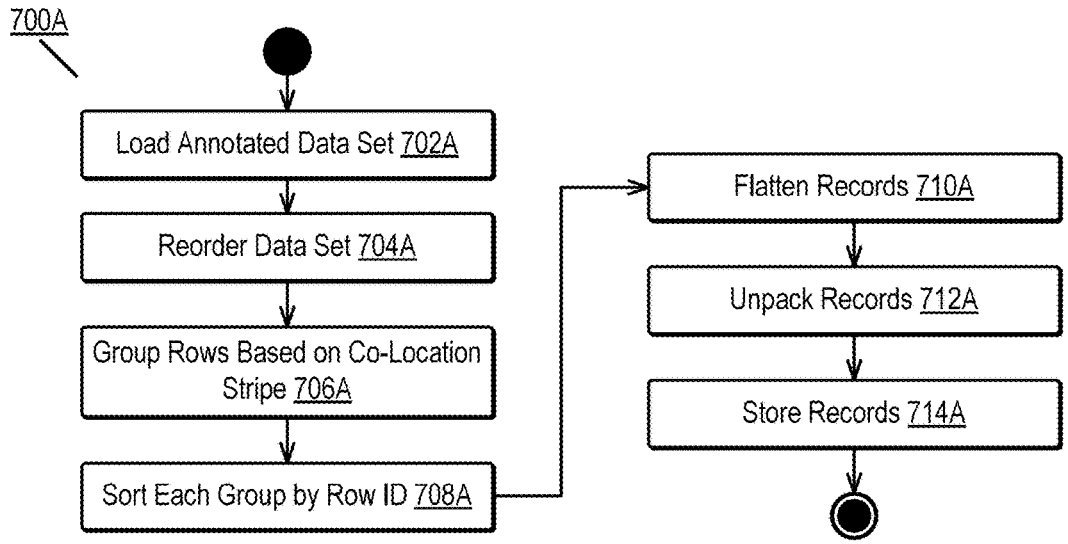
FIG. 7A is a flow diagram illustrating a method for reordering rows in a composite dataset according to some embodiments of the disclosure.

FIG. 7A is a flow diagram illustrating a method for reordering rows in a composite dataset according to some embodiments of the disclosure.

A typical use case in pipelines is the need to group, cogroup, sort, and perform other similar operations to compute a value and then use that value to populate a new attribute upon a fact. For example, the computation of an ODA or Over Delivery Adjustment requires that partial sums of spend from facts grouped by a line or order id must be computed and compared with a budget. Any spend above the budget is distributed back over the facts to cap the revenue. When this operation is performed, the result is a set of facts that are now sorted by an attribute.

In step 702*a*, the method (700*a*) loads an annotation dataset.

In step 704*a*, the method (700*a*) re-orders the annotated dataset. The embodiments place no limits on the ways in which a dataset may be reordered, and any ETL commands that can reorder data may fall within step 704. Some such steps may be explicit or may be a side effect of grouping data. For example, the following Pig code sample illustrates an implicit reordering by using a GROUP command.

```
1.   facts = LOAD '$ROOT/data' USING AnnotatedDataSet( );
2.   facts = FOREACH facts GENERATE
         rowid,
         adv_bid as adv_bid:,
         advertiser_account_id;
3.   grouped = GROUP facts BY advertiser_account_id;
4.   grouped = FOREACH grouped GENERATE
         FLATTEN(facts) as fact,
         SUM(adv_bid) as total_bid;
5.   ungrouped = FOREACH grouped GENERATE
         fact.row_id as row_id,
         total_bid,
         fact.adv_bid/total_bid as percent_total_bid:double;
```

In this code, an annotation dataset is loaded (line 1). A relation including a new row ID (generated using a user-defined function ("rowid") as discussed), advertiser bid (adv_bid) and advertiser account id (advertiser_account_id) is extracted as an annotation dataset (line 2). This new annotation dataset is grouped by the advertiser account id (line 3). Next, the facts relation is flattened to add a total_bid column on each row of the original dataset (line 4). Finally, the original row identifier is extracted from a flattened tuple and added as the row identifier (line 5). In these operations, the resulting data is ordered by the advertiser_account_id field and not the row_id field and thus data in the set is misaligned. Specifically, when the dataset is partitioned into multiple files, these files will no longer have the specific rows expected by the metadata. To correct this, the method (700*a*) reorders the rows based on the row identifier and partitions the rows into reducers aligned to the original split structure.

In step 706*a*, the method (700*a*) groups rows based on a co-location stripe. In one embodiment, the method (700*a*) executes a user-defined function that groups the individual rows of the relation based on a stripe label. In one embodiment, this function takes a row identifier and returns a stripe label. As a result, after executing step 706*a*, the method (700*a*) generates a re-grouped relation having a first field as a stripe label and a tuple representing each row matching that stripe label.

In step 708*a*, the method (700*a*) then sorts each group based on the row identifier of the rows in the tuple.

In step 710*a*, the method (700*a*) then flattens each of the records again after re-ordering the tuples.

In step 712*a*, the method (700*a*) unpacks the records. In the illustrated embodiment, the unpacking comprises unpacking the tuple into the desired data format having a row identifier and any decorated columns (e.g., total_bid and percent_total_bid).

In step 714*a*, the method (700*a*) stores the records. Details of writing annotation datasets has been provided previously, and are not repeated herein.

The preceding steps 706*a*, 708*a*/710*a*, and 712*a* are exemplified in lines 1-3, respectively, of the following pseudo Pig code:

```
1.   regrouped = GROUP ungrouped BY identifyStripe(rowid);
2.   reordered = FOREACH regrouped {
         sorted = ORDER ungrouped BY rowid;
         GENERATE
             FLATTEN(sorted) as sorted_fact;
     }
3.   sorted = FOREACH reordered GENERATE
         FLATTEN(sorted_fact);
```

In the above code, the "identifyStripe" function refers to the UDF that maps row identifiers to stripe labels. In one embodiment, the identifyStripe UDF can be configured to extract the first n bytes of the row identifier to extract the root dataset identifier, file number, split number, and alignment technique (file or stripe). Other techniques may be used.

Figure 7B:
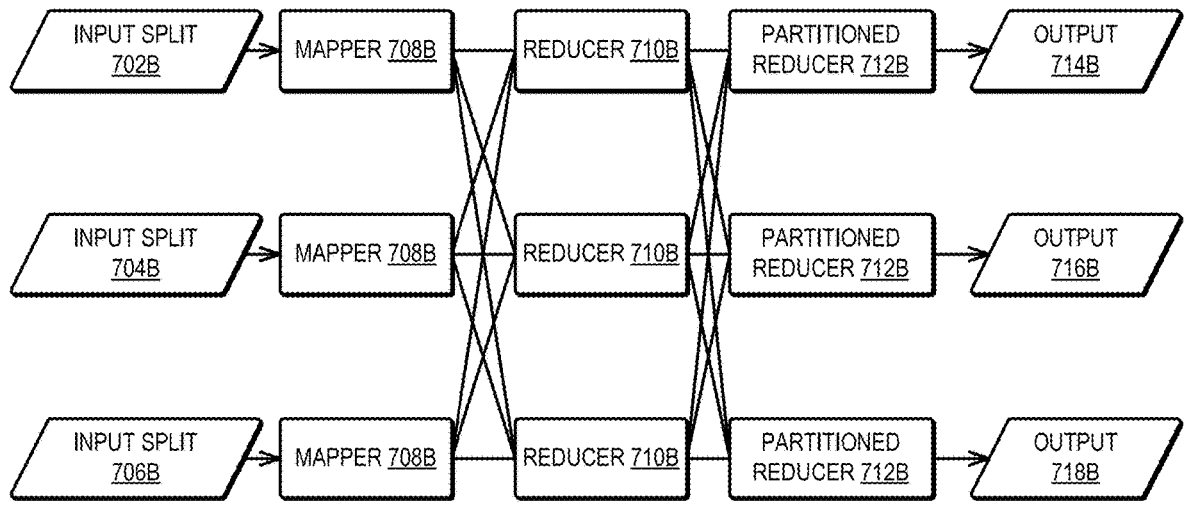
FIG. 7B is a diagram illustrating map-reduce phases implementing a method for reordering rows in a composite dataset according to some embodiments of the disclosure.

FIG. 7B is a diagram illustrating map-reduce phases implementing a method for reordering rows in a composite dataset according to some embodiments of the disclosure.

The aforementioned process effectively enables re-ordering across data files, but adds an additional map-reduce phase to do so. Specifically, an additional partitioned reduce phase is added to perform steps 706*a* through 712*a*.

As illustrated, input splits (702*b*, 704*b*, 706*b*) are processed by the method (700*a*). These inputs splits correspond to either files representing the dataset or stripe groups representing the datasets.

A mapper phase (708*b*) processes each input split, and the output of the mappers (708*b*) is provided to the reducers (710*b*). Although a single map-reduce phase is illustrated, multiple map-reduce phases may be used based on the complexity or format of the ETL instructions. A single map-reduce phase is illustrated for the sake of brevity.

Figure 8:
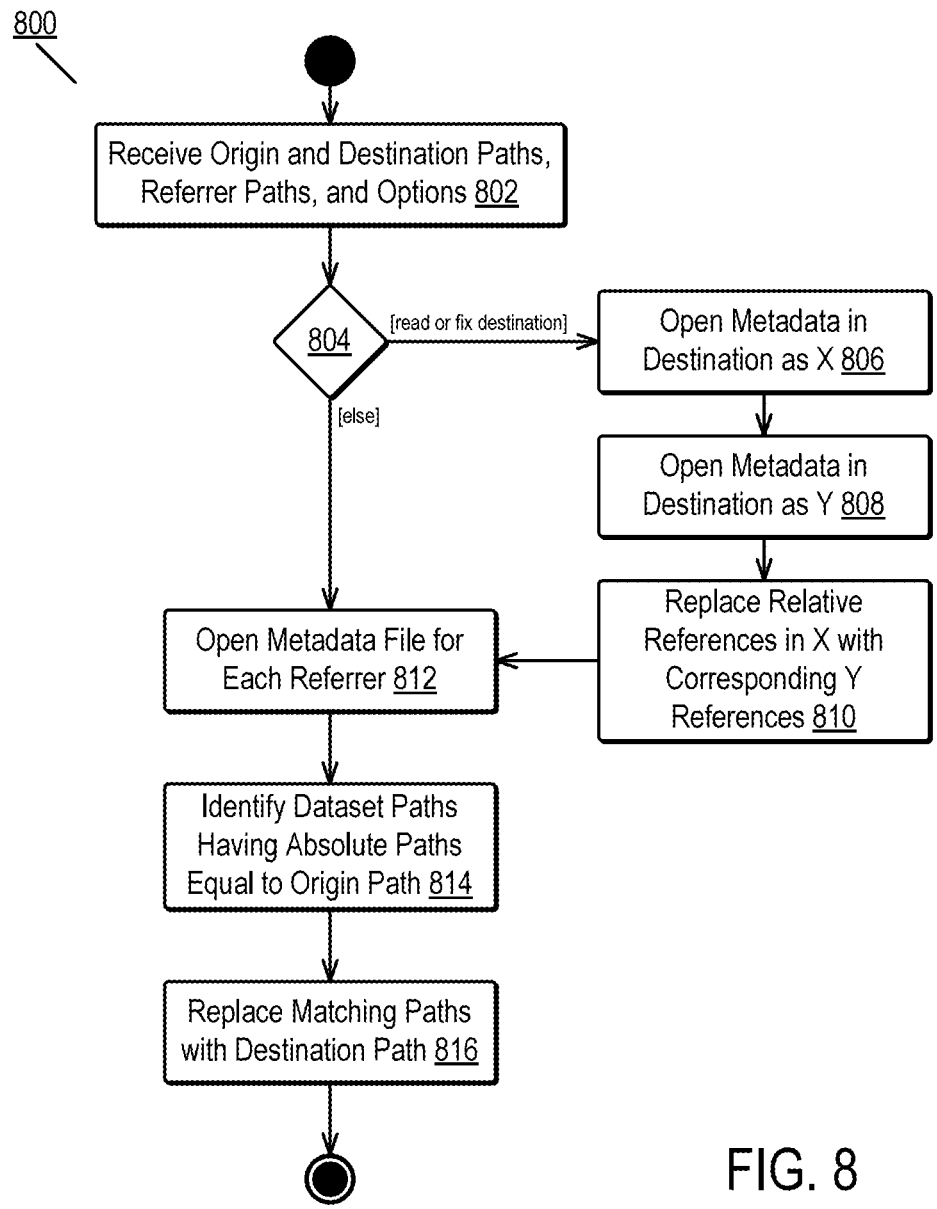
FIG. 8 is a flow diagram illustrating a method for relocating an annotation dataset in a distributed filesystem according to some embodiments of the disclosure.

FIG. 8 is a flow diagram illustrating a method for relocating an annotation dataset in a distributed filesystem according to some embodiments of the disclosure.

The illustrated method (800) allows an annotation dataset to be moved from one path to another on the same distributed node (e.g., a Hadoop instance). Moving the files of an annotation dataset from one directory to another might be successful (for example, if the directories share the same parent and there are no other references). However, in some instances, naively moving datasets using existing commands can be destructive.

For example, given a root dataset X located at a path $ROOT/X and a composite dataset XY located at a path $ROOT/Y, the following command will work since dataset Y includes a relative reference to ../X which resolves to the same path whether Y is located at $ROOT/Y or $ROOT/Z:

hadoop fs my $ROOT/Y $ROOT/Z

Example 1

However, the following command fill fail because dataset Y has a reference to ../X, but this path resolves differently in directory Z/sub because the destination is two directories deep.

hadoop fs my $ROOT/Y $ROOT/Z/sub

Example 2

Further, consider a composite dataset XYZ with path $ROOT/Z. In this scenario, the following command fails:

hadoop fs my $ROOT/Y $ROOT/somewhere

Example 3

Here, the composite dataset XY will be fully readable, because the reference to X will be unchanged. However, composite dataset XYZ will fail to read columns from Y because the reference to ../Y is no longer valid.

Periodically, it may be necessary to rearrange datasets physically within a file system. For this reason, the method (800) repairs references in a metadata file non-destructively.

In block 802, the method receives origin and destination paths, referrer paths, and options. In the illustrated embodiment, the origin path comprises an original dataset path where references to other datasets were generated that would normally have contained a corresponding metadata file. In some embodiments, the origin path will not exist after the method (800) ends. The destination path comprises a new location for the dataset that contains the metadata file stored in the origin path. In the illustrated embodiment, the method (800) is executed after a move has already occurred. The referrer paths include zero or more optional dataset paths that reference the dataset stored in the origin path that may be broken by a move. The options may comprise a plurality of options controlling the method. For example, one option may cause the method (800) to simulate a move. Another option (described in step 804) disables the correction of metadata files.

In step 804, the method (800) determines if the metadata file to be stored at the destination path should be corrected. In one embodiment, step 804 is executed by downstream consumers of a dataset to be relocated. If the method (800) determines that the metadata file should be read and corrected, the method (800) proceeds to step 806.

In step 806, the method (800) opens the metadata file stored in the destination path normally. In some embodiments, the opening of a metadata file will cause all relative references (i.e., references to dataset locations) to be resolved to absolute locations. This metadata file is referred to as X.

In step 808, the method (800) opens the metadata file stored in the destination path as if the metadata file was located in the origin path. In the illustrated embodiment, the method (800) effectively simulates opening the new metadata file in the origin path. This will cause all of the references to dataset locations to resolve as they did before the move executed before step 802. This metadata file is referred to as Y.

In step 810, the method replaces relative references in X with corresponding Y references. In this step, the method (800) iterates through each dataset reference in Y and finds the same reference in X. Since the files X and Y are copies, each reference in Y should match a reference in X. In one embodiment, the method (800) matches the references based on the identifiers of the references. Next, the method compares the absolute paths of the identified references in X and Y. For any pairs that differ, the method (800) will replace the reference in X with the reference in Y. In some embodiments, the method (800) replaces the reference with the absolute reference.

In one embodiment, the method saves the modified version X to disk in the destination path as part of step 810. Alternatively, the method (800) may list the changes to be made and exit.

After executing step 810, or upon determining that the destination metadata file should not be fixed, the method (800) proceeds to step 812.

In step 812, the method (800) opens a metadata file located at each referrer path provided in step 802. As described above, opening these metadata files will resolve relative paths to absolute paths.

In step 814, the method (800) identifies any dataset paths in the referrer path metadata files that have absolute paths equal to the origin path. This may be accomplished similar to that performed in step 808.

In step 816, the method (800) replaces the matching paths with the destination path. Thus, in step 816, the method (800) iterates through any dependent metadata files and proactively updates the dataset paths to point to the destination path.

Thus, Example 1 discussed above may utilize the aforementioned method as follows:

---
hadoop fs mv $ROOT/Y $ROOT/Z
relocate $ROOT/Y $ROOT/Z
---

Example 4

Here, after executing a regular move, the method (800) is executed setting the origin path to $ROOT/Y and the destination path to $ROOT/Z Example 2 may be modified as follows:

---
hadoop fs mv $ROOT/Y $ROOT/Z/sub
relocate $ROOT/Y $ROOT/Z/sub
---

Example 5

Example 3 may be modified as follows:

---
hadoop fs mv $ROOT/Y $ROOT/somewhere
relocate $ROOT/Y $ROOT/somewhere $ROOT/Z
---

Example 6

Figure 9:
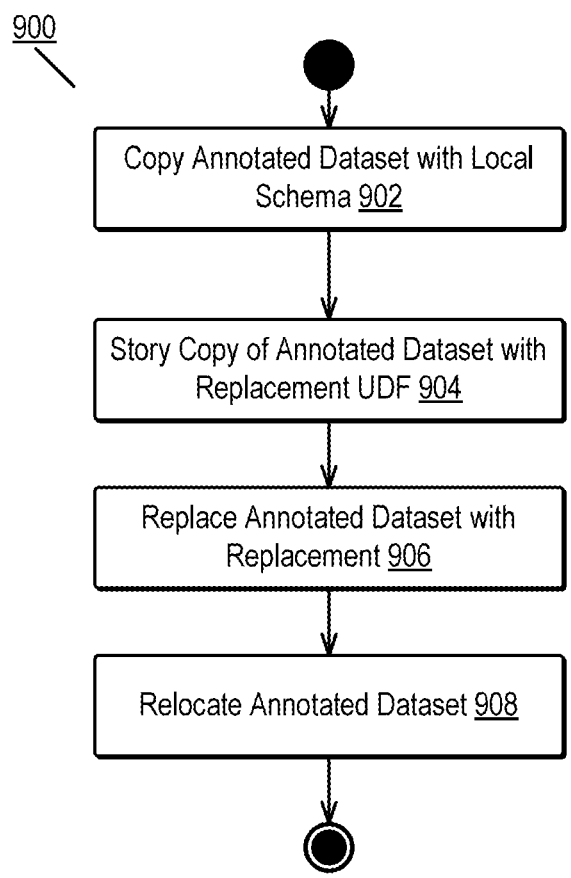
FIG. 9 is a flow diagram illustrating a method for replacing an annotated dataset according to some embodiments of the disclosure.

FIG. 9 is a flow diagram illustrating a method for replacing an annotated dataset according to some embodiments of the disclosure.

The foregoing methods may be combined with ETL transformations to provide replacement storage options for the annotated datasets. The following extended example provides an example of performing an in-place update of an annotated dataset to comply with GDPR requirements. In the example, the following two datasets are presumed:

---
X: a root dataset at $ROOT/mbserve_root
XY: an annotated dataset at $ROOT/mbserve_annotated
---

In step 902, the method (900) copies an annotated dataset using a local schema.

In step 904, the method (900) stores the copy of the annotated dataset using a replacement user-defined function.

The foregoing steps may be illustrated using the following Pig code:

---
1.   facts = LOAD '$ROOT/mbserve_annotated' USING
         AnnotatedStorage('"localSchemaOnly":true');
STORE facts INTO '$ROOT/mbserve_replacement' USING
ReplacementStorage('"replacementFor":"$ROOT/mbserve_annotated"');
---

The first step represents a simplistic copying of data from the annotated dataset to a replacement dataset. The parameter localSchemaOnly is a new read parameter that limits the returned schema to just those columns local to the database path. Thus, if reading from XYZ, then only the columns of Z will be returned (including the row identifier). As one example, the local schema may filter out sensitive data from the annotated dataset to comply with GDPR requirements, user request, or other rationales.

As illustrated in line 2, the dataset is written using a ReplacementStorage UDF. The ReplacementStorage UDF is a subclass of the normal annotated storage UDF that sets the replacement flag. During a replacement operation, the UDF works the same as the annotation storage, except as follows. First, any rows received by the ReplacementStorage UDF have their row identifier checked against the replacement row identifier. Any rows with a different identified cause the UDF to fail. Second, during metadata creation, the dataset identifier for the output store is set to the dataset identifier of the copied dataset (e.g., "mbserve_annotated"). Additionally, new metadata is not created as an annotation for the input dataset. Rather, the metadata is generated using the structure of the replacement dataset. For example, if replacing Z in XYZ with W, instead of creating XYZW, the method creates XYW. Third, the UDF fails if the input dataset comprises a root dataset. This aspect may be optional. Finally, in some embodiments, the UDF enforces the requirement that the schema of the replacement does not change between loading and storing of the annotated data. Notably, columns may be removed via the local schema, but changes to the schema after load are forbidden, In step 906, the method (900) replaces the annotated dataset with the replacement dataset. In one embodiment, this step comprises executing standard filesystem move commands:

```
hadoop fs mv $ROOT/mbserve_annotated
    $ROOT/mbserve_delete
hadoop fs mv $ROOT/mbserve_replacement \
    $ROOT/mbserve_annotated
```

In step 908, the method (900) relocates the files using the methods described in FIG. 8. For example:

```
relocate $ROOT/mbserve_replacement
    $ROOT_mbserve_annotated
```

In some embodiments, step 908 is optional.

In some embodiments, the foregoing method (900) may be utilized when datasets are stripe-aligned to replace data using different parallelism to reduce the number of files being produced. Additionally, the method (900) may be used to anonymize one or more columns of the annotated dataset.

Figure 10:
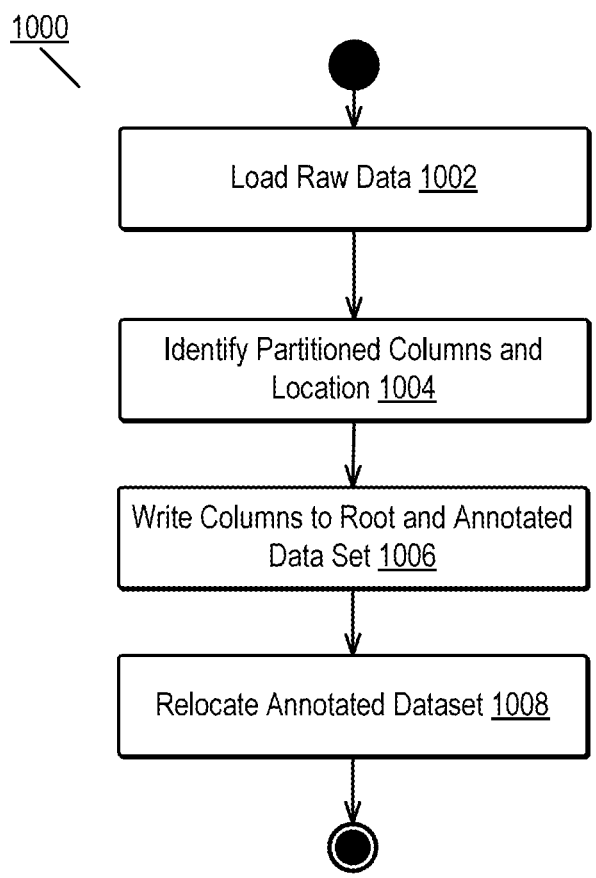
FIG. 10 is a flow diagram illustrating a method for storing a raw dataset using partitioned columns according to some embodiments of the disclosure.

FIG. 10 is a flow diagram illustrating a method for storing a raw dataset using partitioned columns according to some embodiments of the disclosure.

In step 1002, the method (1000) loads a raw data file. In some embodiments, this comprises a non-annotated or standard data file such as an Avro file.

In step 1004, the method (1000) identifies one or more columns desired to be segmented out from the raw data file. For example, if the raw file includes columns, ABCDE, the method (1000) may select columns D and E as partitioned columns. Further, in step 1004, the method (1000) identifies a location to store the partitioned columns. In some embodiments, this location is relative path (e.g., ".private").

In step 1006, the method (1000) writes the non-partitioned columns (e.g., ABC) to a root dataset at a first location. The method (1000) also writes the partitioned columns (e.g., DE) to a second location specified in step 1004. In one embodiment, the first location is a location on disk and the second location is a subdirectory in that location. In the illustrated embodiment, the partitioned columns are written as an annotated dataset, as described above. Thus, the entire dataset (ABCDE) is a composite dataset.

In step 1008, the method (1000) can optionally relocate the annotated dataset (e.g., DE) to a desired location using the methods described in FIG. 8.

In the above method (1000) a user can create a new annotated dataset and simultaneously separate columns while initially writing the dataset. A sample Pig script for performing this operation is provided below:

```
facts = LOAD '$ROOT/raw' USING AvroLoader( );
--- Other operations
STORE facts INTO '$ROOT/mbserve_partitioned' USING
CreationStorage("
    'columnPartitions': [
        {
            'subDir': '.private',
            'columns': 'complexity,upper_url,log_bid,log_bid_usd'
        }
    ]
");
```

Here, the subDir and columns correspond to the second location and columns to partition. As illustrated the column partitioning is performed by the CreationStorage UDF. As a result of the above operations, two paths are created:

```
$ROOT/mbserve_partitioned
$ROOT/mbserve_partitioned/.private
```

A user can then relocate the .private path to a desired location and modify the permissions of the file accordingly:

```
sh relocate $ROOT/mbserve_partitioned/.private \
    $ROOT/mbserve_private
fs -chmod 700 $ROOT/mbserve_private
```

Notably, since the annotation dataset is newly created, no referrers exist to correct. In some embodiments, the second location may be outside the directory the root dataset is written to, however this may not be implemented in some languages (e.g., Pig).

When partitioning a dataset by columns, the following modifications are made on the write process.

When the first record is to be written, the root dataset is opened and an additional new file for each column partition in the indicated sub directory is opened. In the given example, if opening file ./part.00000, then the method (1000) also creates a corresponding file ./.private/part.00000. The first file has a schema missing the partitioned columns. The second file has a schema of only the partitioned columns.

If using stripe alignment, when the primary file is opened, a callback is registered to listen to stripes being flushed. For each record that is written to the composite dataset, the method (1000) splits the columns between the primary files and the partition files according to the column partitioning, writing a record to each one. In one embodiment, the method (1000) writes to the partitioned files first and the root file last. If the root file signals a stripe being committed to the writer callback, each partitioned file should be flushed to maintain alignment.

During partial metadata collection, the method (1000) will create the primary root dataset metadata file first using the normal procedure for root dataset metadata collection. Using the root dataset metadata as a guide, the method (1000) will create metadata for the partitioned datasets. Root dataset references should be easy to compute as the filenames will match perfectly and the stripes will appear in the same order between the files. The method (1000) then will construct each partition sequentially depending on the one prior. For example, if two columnPartitions A and B were requested on dataset X, the resulting composites should be X, XA, XAB.

In an alternative embodiment, the method (1000) may set a combined split size. This may force the replacement storage UDF to split on stripe boundaries as described above which reduces the total number of files. In another embodiment, a union operation may be provided that creates a row union (of only one dataset) by creating an empty annotation in a public directory. This union is built from the private annotation, and thus will contain references to all of the protected files and the columns they produce. A privileged user should be able to read and access these files. A non-privileged user may not, but can still create annotations that reference the protected files.

Figure 11:
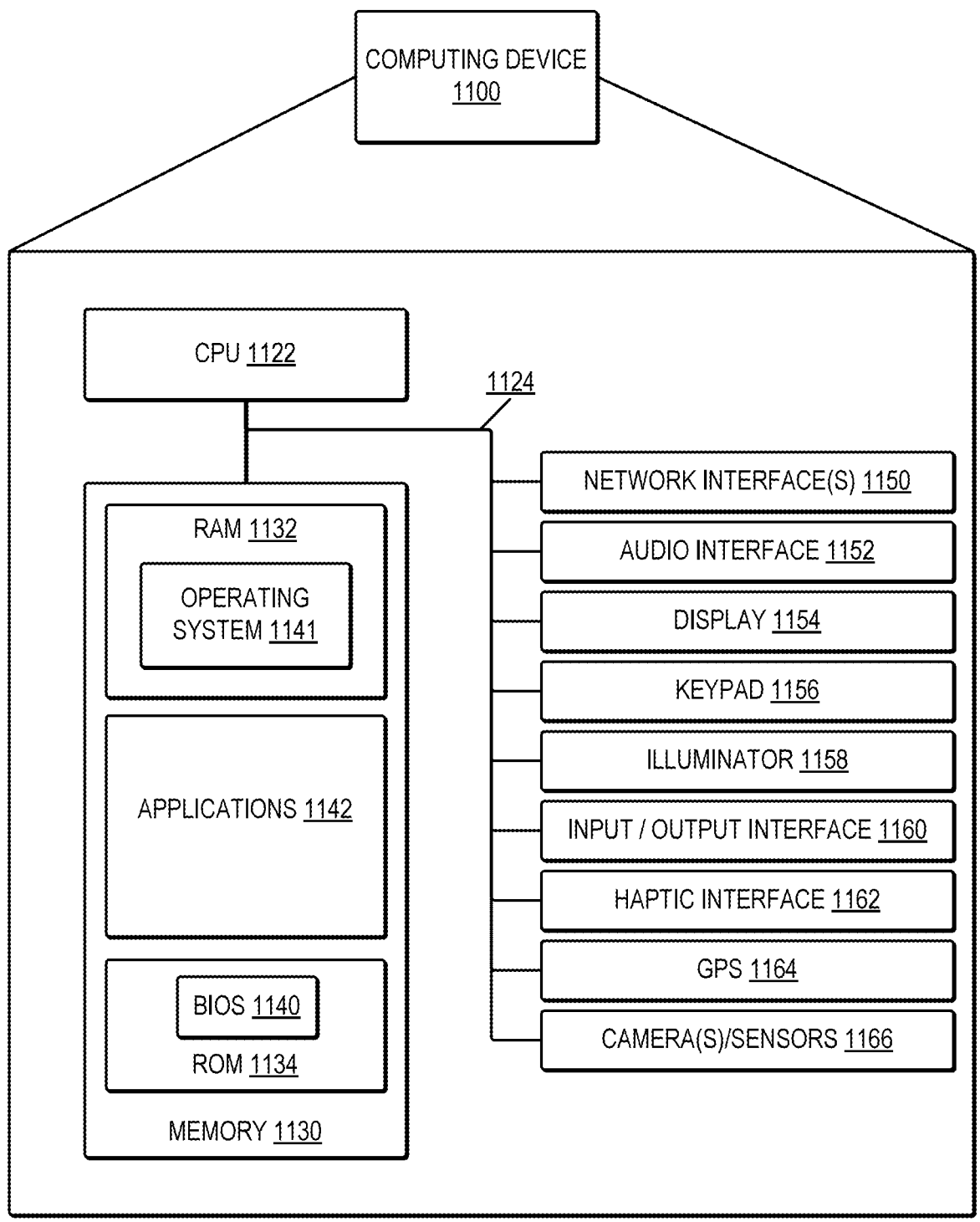
FIG. 11 is a schematic diagram illustrating a computing device showing an example embodiment of a client or server device that may be used within the present disclosure.

FIG. 11 is a schematic diagram illustrating a computing device showing an example embodiment of a client or server device that may be used within the present disclosure.

Computing device (1100) may include more or fewer components than those shown in FIG. 11. For example, a server computing device may not include audio interfaces, displays, keypads, illuminators, haptic interfaces, GPS receivers and cameras or sensors.

As shown in the figure, device (1100) includes a processing unit (CPU) (1122) in communication with a mass memory (1130) via a bus (1124). Computing device (1100) also includes one or more network interfaces (1150), an audio interface (1152), a display (1154), a keypad (1156), an illuminator (1158), an input/output interface (1160), a haptic interface (1162), an optional global positioning systems (GPS) receiver (1164) and a camera(s) or other optical, thermal, or electromagnetic sensors (1166). Device (1100) can include one camera/sensor (1166), or a plurality of cameras/sensors (1166), as understood by those of skill in the art. The positioning of the camera(s)/sensor(s) (1166) on device (1100) can change per device (1100) model, per device (1100) capabilities, and the like, or some combination thereof.

Computing device (1100) may optionally communicate with a base station (not shown), or directly with another computing device. Network interface (1150) is sometimes known as a transceiver, transceiving device, or network interface card (NIC).

Audio interface (1152) is arranged to produce and receive audio signals such as the sound of a human voice. For example, audio interface (1152) may be coupled to a speaker and microphone (not shown) to enable telecommunication with others and/or generate an audio acknowledgement for some action. Display (1154) may be a liquid crystal display (LCD), gas plasma, light emitting diode (LED), or any other type of display used with a computing device. Display (1154) may also include a touch sensitive screen arranged to receive input from an object such as a stylus or a digit from a human hand.

Keypad (1156) may comprise any input device arranged to receive input from a user. Illuminator (1158) may provide a status indication and/or provide light.

Computing device (1100) also comprises input/output interface (1160) for communicating with external. Input/output interface (1160) can utilize one or more communication technologies, such as USB, infrared, Bluetooth™, or the like. Haptic interface (1162) is arranged to provide tactile feedback to a user of the client device.

Optional GPS transceiver (1164) can determine the physical coordinates of computing device (1100) on the surface of the Earth, which typically outputs a location as latitude and longitude values. GPS transceiver (1164) can also employ other geo-positioning mechanisms, including, but not limited to, triangulation, assisted GPS (AGPS), E-OTD, CI, SAI, ETA, BSS, or the like, to further determine the physical location of computing device (1100) on the surface of the Earth. In one embodiment, however, computing device may through other components, provide other information that may be employed to determine a physical location of the device, including for example, a MAC address, Internet Protocol (IP) address, or the like.

Mass memory (1130) includes a RAM (1132), a ROM (1134), and other storage means. Mass memory (1130) illustrates another example of computer storage media for storage of information such as computer-readable instructions, data structures, program modules or other data. Mass memory (1130) stores a basic input/output system ("BIOS") (1140) for controlling low-level operation of computing device (1100). The mass memory also stores an operating system (1141) for controlling the operation of computing device (1100)

Applications (1142) may include computer executable instructions which, when executed by computing device (1100), perform any of the methods (or portions of the methods) described previously in the description of the preceding Figures. In some embodiments, the software and/or programs implementing the method embodiments can be read from hard disk drive (not illustrated) and temporarily stored in RAM (1132) by CPU (1122). CPU (1122) may then read the software and/or data from RAM (1132), process them, and store them to RAM (1132) again.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   reading a raw dataset, the raw dataset comprising a first set of columns and a first set of rows;
   generating an annotation dataset, the annotation dataset comprising a second set of columns and a second set of rows;
   generating row identifiers based on storage characteristics of the raw dataset and the annotation dataset, the storage characteristics of the raw dataset comprising a unique identifier of the raw dataset, and one or more of a file identifier of the raw dataset or a stripe number of the raw dataset, and the storage characteristics of the annotation dataset comprising a second unique identifier of an input dataset used to generate the annotation dataset;
   assigning the row identifiers to each row in the second set of rows, the row identifiers aligning the second set of rows with the first set of rows; and
   writing the annotation dataset to a distributed storage medium.

2. The method of claim 1, the reading a raw dataset comprising reading one or more physical datasets comprising a composite dataset.

3. The method of claim 1, the generating an annotation dataset comprising mapping a file storing the annotation dataset to a file associated with the raw dataset and used to generate the annotation dataset.

4. The method of claim 1, the generating an annotation dataset comprising mapping a file storing the annotation dataset to a stripe associated with the raw dataset and used to generate the annotation dataset.

5. The method of claim 1, further comprising:
   reading the annotation dataset;
   processing one or more rows of the annotation dataset, the processing resulting in a first re-ordering of the annotation dataset;
   performing a second re-ordering on the annotation dataset based on the row-identifiers; and
   storing the annotation dataset as a processed annotation dataset to the distributed storage medium.

6. A non-transitory computer-readable storage medium for tangibly storing computer program instructions capable of being executed by a computer processor, the computer program instructions defining the steps of:
   reading a raw dataset, the raw dataset comprising a first set of columns and a first set of rows;
   generating an annotation dataset, the annotation dataset comprising a second set of columns and a second set of rows;
   generating row identifiers based on storage characteristics of the raw dataset and the annotation dataset, the storage characteristics of the raw dataset comprising a unique identifier of the raw dataset, and one or more of a file identifier of the raw dataset or a stripe number of the raw dataset, and the storage characteristics of the annotation dataset comprising a second unique identifier of an input dataset used to generate the annotation dataset;
   assigning the row identifiers to each row in the second set of rows, the row identifiers aligning the second set of rows with the first set of rows; and
   writing the annotation dataset to a distributed storage medium.

7. The non-transitory computer-readable storage medium of claim 6, the reading a raw dataset comprising reading one or more physical datasets comprising a composite dataset.

8. The non-transitory computer-readable storage medium of claim 6, the generating an annotation dataset comprising mapping a file storing the annotation dataset to a file associated with the raw dataset and used to generate the annotation dataset.

9. The non-transitory computer-readable storage medium of claim 6, the generating an annotation dataset comprising mapping a file storing the annotation dataset to a stripe associated with the raw dataset and used to generate the annotation dataset.

10. The non-transitory computer-readable storage medium of claim 6, the instructions further defining the steps of:
    reading the annotation dataset;
    processing one or more rows of the annotation dataset, the processing resulting in a first re-ordering of the annotation dataset;
    performing a second re-ordering on the annotation dataset based on the row-identifiers; and
    storing the annotation dataset as a processed annotation dataset to the distributed storage medium.

11. An apparatus comprising:
    a processor; and
    a storage medium for tangibly storing thereon program logic for execution by the processor, the stored program logic causing the processor to perform the operations of:
      reading a raw dataset, the raw dataset comprising a first set of columns and a first set of rows;

generating an annotation dataset, the annotation dataset comprising a second set of columns and a second set of rows;

generating row identifiers based on storage characteristics of the raw dataset and the annotation dataset, the storage characteristics of the raw dataset comprising a unique identifier of the raw dataset, and one or more of a file identifier of the raw dataset or a stripe number of the raw dataset, and the storage characteristics of the annotation dataset comprising a second unique identifier of an input dataset used to generate the annotation dataset;

assigning the row identifiers to each row in the second set of rows, the row identifiers aligning the second set of rows with the first set of rows; and writing the annotation dataset to a distributed storage medium.

12. The apparatus of claim 11, the generating an annotation dataset comprising mapping a file storing the annotation dataset to a file associated with the raw dataset and used to generate the annotation dataset.

13. The apparatus of claim 11, the generating an annotation dataset comprising mapping a file storing the annotation dataset to a stripe associated with the raw dataset and used to generate the annotation dataset.

14. The apparatus of claim 11, the stored program logic further causing the processor to perform the steps of:

reading the annotation dataset;

processing one or more rows of the annotation dataset, the processing resulting in a first re-ordering of the annotation dataset;

performing a second re-ordering on the annotation dataset based on the row-identifiers; and storing the annotation dataset as a processed annotation dataset to the distributed storage medium.

* * * * *